(12) United States Patent
Minor et al.

(10) Patent No.: US 9,598,621 B2
(45) Date of Patent: Mar. 21, 2017

(54) REFRIGERANT MIXTURES COMPRISING DIFLUOROMETHANE, PENTAFLUOROETHANE, AND TETRAFLUOROPROPENE AND USES THEREOF

(71) Applicant: THE CHEMOURS COMPANY FC, LLC, Wilmington, DE (US)

(72) Inventors: Barbara Haviland Minor, Elkton, MD (US); Kenneth J. Schultz, Onalaska, WI (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

(21) Appl. No.: 15/025,741

(22) PCT Filed: Oct. 6, 2014

(86) PCT No.: PCT/US2014/059249
§ 371 (c)(1),
(2) Date: Mar. 29, 2016

(87) PCT Pub. No.: WO2015/054104
PCT Pub. Date: Apr. 16, 2015

(65) Prior Publication Data
US 2016/0215192 A1    Jul. 28, 2016

Related U.S. Application Data

(60) Provisional application No. 61/889,076, filed on Oct. 10, 2013.

(51) Int. Cl.
*C09K 5/04* (2006.01)
*F25B 45/00* (2006.01)

(52) U.S. Cl.
CPC .............. *C09K 5/045* (2013.01); *F25B 45/00* (2013.01); *C09K 2205/122* (2013.01); *C09K 2205/126* (2013.01); *C09K 2205/22* (2013.01); *C09K 2205/40* (2013.01)

(58) Field of Classification Search
CPC ........ C09K 2205/122; C09K 2205/126; C09K 2205/22; C09K 2205/00; C09K 2205/102; C09K 2205/104; C09K 2205/106; C09K 2205/108; C09K 2205/11; C09K 2205/112; C09K 2205/114; C09K 2205/116; C09K 2205/124; C09K 2205/128; C09K 2205/13; C09K 2205/132; C09K 2205/134; C09K 2205/24; C09K 2205/32; C09K 2205/34; C09K 2205/40; C09K 2205/41; C09K 2205/42; C09K 2205/43; C09K 2205/44; C09K 2205/45; C09K 2205/46; C09K 2205/47; C09K 2205/48; C09K 5/08; C09K 5/10; C10M 171/008; C10N 2030/00; C10N 2030/06; C10N 2030/08; C10N 2030/10; C10N 2030/12; C10N 2030/18; C10N 2030/20; C10N 2040/30
USPC ................................. 252/67, 68, 69; 62/529
See application file for complete search history.

(56) References Cited

U.S. PATENT DOCUMENTS

| | | | |
|---|---|---|---|
| 7,914,698 B2 | 3/2011 | Minor et al. | |
| 2007/0284555 A1 | 12/2007 | Leck et al. | |
| 2009/0250650 A1* | 10/2009 | Minor .................. | A62D 1/0057 252/2 |
| 2011/0108756 A1 | 5/2011 | Tsuchiya et al. | |
| 2012/0267564 A1* | 10/2012 | Leck ....................... | C09K 5/045 252/68 |
| 2013/0055738 A1 | 3/2013 | Rached | |
| 2013/0096218 A1 | 4/2013 | Rached et al. | |
| 2014/0223927 A1 | 8/2014 | Pottker et al. | |
| 2015/0013942 A1* | 1/2015 | Minor ...................... | C08J 9/146 165/104.21 |
| 2015/0033770 A1* | 2/2015 | Minor .................... | C09K 5/045 62/77 |
| 2016/0145481 A1* | 5/2016 | Kujak ................... | C09K 5/045 252/67 |

FOREIGN PATENT DOCUMENTS

| | | | | |
|---|---|---|---|---|
| EP | 1 985 680 A2 | 10/2008 | | |
| EP | 2 767 569 A1 | 8/2014 | | |
| FR | WO 2011141655 A2 * | 11/2011 | ............. | C09K 5/045 |
| WO | 2015/036677 A1 | 3/2015 | | |

OTHER PUBLICATIONS

PCT International Search Report and Written Opinion mailed Mar. 5, 2015.

* cited by examiner

*Primary Examiner* — Douglas McGinty
(74) *Attorney, Agent, or Firm* — N. Lynn Tucker

(57) ABSTRACT

In accordance with the present invention refrigerant compositions are disclosed. The refrigerant compositions contain comprise 11-28 weight percent difluoromethane; 34-59 weight percent pentafluoroethane; and 21-38 weight percent 2,3,3,3-tetrafluoropropene. The refrigerant compositions are useful in processes to produce cooling, in methods for replacing refrigerant R-404A or R-507A, and in refrigeration systems. These inventive refrigerant compositions can be used in stationary and mobile refrigeration equipment, and are particularly useful for transport refrigeration units.

20 Claims, 1 Drawing Sheet

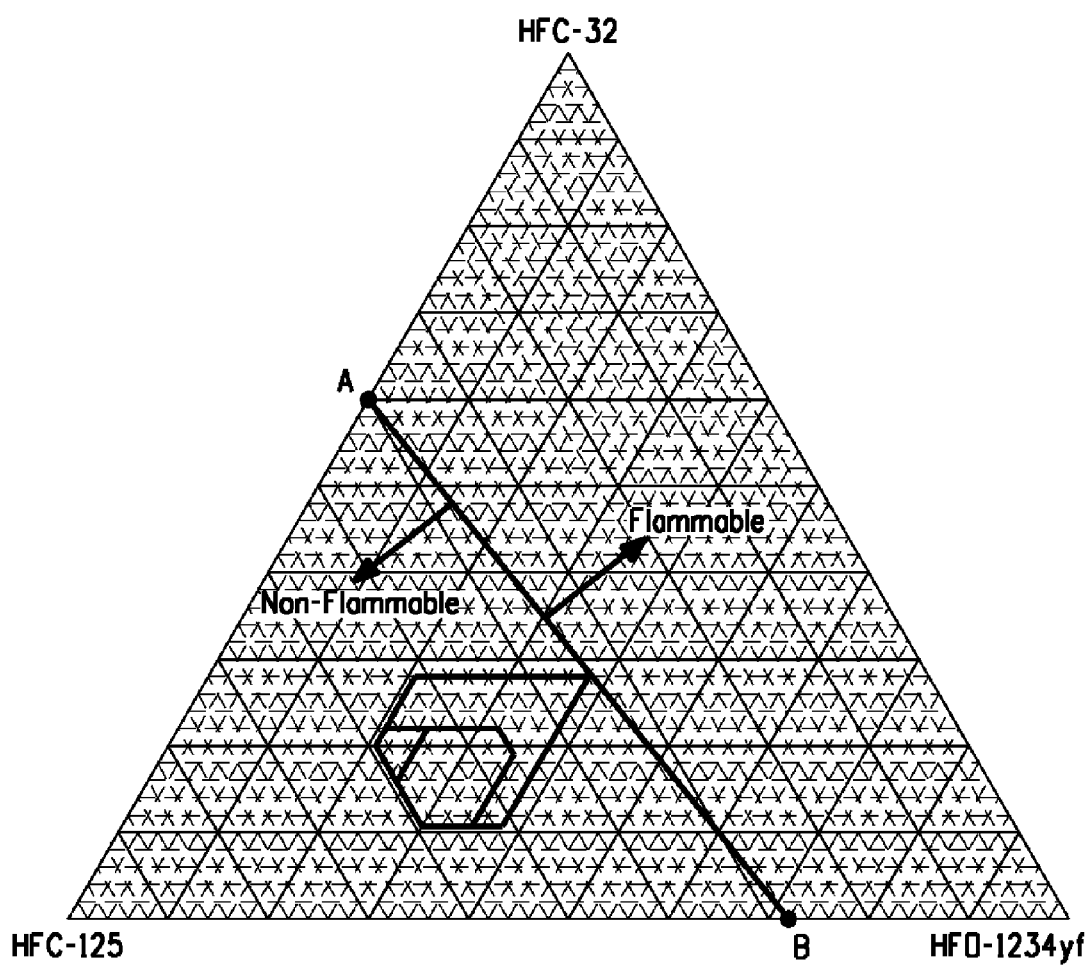

REFRIGERANT MIXTURES COMPRISING DIFLUOROMETHANE, PENTAFLUOROETHANE, AND TETRAFLUOROPROPENE AND USES THEREOF

This application represents a national filing under 35 U.S.C. 371 of International Application No. PCT/US2014/059249 filed Oct. 6, 2014, and claims priority of U.S. Provisional Application No. 61/889,076 filed Oct. 10, 2013.

BACKGROUND

1. Field of the Disclosure

The present disclosure relates to compositions for use in refrigeration, air conditioning or heat pump systems. The compositions of the present invention are useful in methods for producing cooling and heating, and methods for replacing refrigerants and refrigeration, air conditioning and heat pump apparatus.

2. Description of Related Art

The refrigeration industry has been working for the past few decades to find replacement refrigerants for the ozone-depleting chlorofluorocarbons (CFCs) and hydrochlorofluorocarbons (HCFCs) being phased out as a result of the Montreal Protocol. The solution for most refrigerant producers has been the commercialization of hydrofluorocarbon (HFC) refrigerants. The new HFC refrigerants, HFC-134a, R-404A and R-410A being the most widely used at this time, have zero ozone depletion potential and thus are not affected by the current regulatory phase out as a result of the Montreal Protocol.

Further environmental regulations may ultimately cause global phase out of certain HFC refrigerants. Currently, industry is facing regulations relating to global warming potential (GWP) for refrigerants used in mobile air-conditioning. Should the regulations be more broadly applied in the future, for instance for stationary air conditioning and refrigeration systems, an even greater need will be felt for refrigerants that can be used in all areas of the refrigeration and air-conditioning industry. Uncertainty as to the ultimate regulatory requirements relative to GWP, have forced the industry to consider multiple candidate compounds and mixtures.

Previously proposed replacement refrigerants for HFC refrigerants and refrigerant blends include HFC-152a, pure hydrocarbons, such as butane or propane, or "natural" refrigerants such as ammonia or $CO_2$. Each of these suggested replacements has problems including toxicity, flammability, low energy efficiency, or requires major equipment design modifications. New replacements are also being proposed for HCFC-22, R-134a, R-404A, R-507A, R-407C and R-410A, among others. Uncertainty as to what regulatory requirements relative to GWP will ultimately be adopted have forced the industry to consider multiple candidate compounds and mixtures that balance the need for low GWP, non-flammability, low glide and existing system performance parameters.

BRIEF SUMMARY

Certain compositions comprising difluoromethane, pentafluoroethane, and tetrafluoropropene have been found to possess suitable properties to allow their use as replacements for currently available commercial refrigerants, in particular R-404A and R-507A, with high GWP. Other alternatives, such as R-407A or R-407F are available with lower GWP, however, these refrigerants have other disadvantages, specifically higher compressor discharge temperatures, which can lead to early breakdown of compressors. Therefore, the present inventors have discovered refrigerant gases that are non-ozone depleting, and have significantly less direct global warming potential, and have lower compressor discharge temperatures than existing alternatives and are thus more environmentally sustainable alternatives.

In accordance with the present invention refrigerant compositions are disclosed. The refrigerant compositions comprise 11-28 weight percent difluoromethane; 34-59 weight percent pentafluoroethane; and 21-38 weight percent 2,3,3,3-tetrafluoropropene.

The refrigerant compositions are useful as components in compositions also containing non-refrigerant components (e.g., lubricants), in processes to produce cooling, in methods for replacing refrigerant R-404A or R507A, and in refrigeration systems. These inventive refrigerant compositions can be used in either medium or low temperature refrigeration equipment.

BRIEF DESCRIPTION OF THE FIGURES

FIG. 1 is a plot of embodiments of the range of compositions as claimed. Each apex of the triangle corresponds to 100% of the labeled components, HFC-32, HFC-125 and HFO-1234yf.

DETAILED DESCRIPTION

Before addressing details of embodiments described below, some terms are defined or clarified.

DEFINITIONS

As used herein, the term heat transfer fluid means a composition used to carry heat from a heat source to a heat sink.

A heat source is defined as any space, location, object or body from which it is desirable to add, transfer, move or remove heat. Examples of heat sources are spaces (open or enclosed) requiring refrigeration or cooling, such as refrigerator or freezer cases in a supermarket, transport refrigerated containers, building spaces requiring air conditioning, industrial water chillers or the passenger compartment of an automobile requiring air conditioning. In some embodiments, the heat transfer composition may remain in a constant state throughout the transfer process (i.e., not evaporate or condense). In other embodiments, evaporative cooling processes may utilize heat transfer compositions as well.

A heat sink is defined as any space, location, object or body capable of absorbing heat. A vapor compression refrigeration system is one example of such a heat sink.

A refrigerant is defined as a heat transfer fluid that undergoes a phase change from liquid to gas and back again during a cycle used to transfer of heat.

A heat transfer system is the system (or apparatus) used to produce a heating or cooling effect in a particular space. A heat transfer system may be a mobile system or a stationary system.

Examples of heat transfer systems are any type of refrigeration systems and air conditioning systems including, but are not limited to, stationary heat transfer systems, air conditioners, freezers, refrigerators, heat pumps, water chillers, flooded evaporator chillers, direct expansion chillers, walk-in coolers, mobile refrigerators, mobile heat transfer systems, mobile air conditioning units, dehumidifiers, and combinations thereof.

As used herein, mobile heat transfer system refers to any refrigeration, air conditioner or heating apparatus incorporated into a transportation unit for the road, rail, sea or air. In addition, mobile refrigeration or air conditioner units, include those apparatus that are independent of any moving carrier and are known as "intermodal" systems. Such intermodal systems include "container" (combined sea/land transport) as well as "swap bodies" (combined road/rail transport).

As used herein, stationary heat transfer systems are systems that are fixed in place during operation. A stationary heat transfer system may be associated within or attached to buildings of any variety or may be stand-alone devices located out of doors, such as a soft drink vending machine. These stationary applications may be stationary air conditioning and heat pumps, including but not limited to chillers, high temperature heat pumps, residential, commercial or industrial air conditioning systems (including residential heat pumps), and including window, ductless, ducted, packaged terminal, and those exterior but connected to the building such as rooftop systems. In stationary refrigeration applications, the disclosed compositions may be useful in equipment including commercial, industrial or residential refrigerators and freezers, ice machines, self-contained coolers and freezers, flooded evaporator chillers, direct expansion chillers, walk-in and reach-in coolers and freezers, and combination systems. In some embodiments, the disclosed compositions may be used in supermarket refrigeration systems. Additionally, stationary applications may utilize a secondary loop system that uses a primary refrigerant to produce cooling in one location that is transferred to a remote location via a secondary heat transfer fluid.

Refrigeration capacity (also referred to as cooling capacity) is a term which defines the change in enthalpy of a refrigerant in an evaporator per pound of refrigerant circulated, or the heat removed by the refrigerant in the evaporator per unit volume of refrigerant vapor exiting the evaporator (volumetric capacity). The refrigeration capacity is a measure of the ability of a refrigerant or heat transfer composition to produce cooling. Therefore, the higher the capacity, the greater the cooling that is produced. Cooling rate refers to the heat removed by the refrigerant in the evaporator per unit time.

Coefficient of performance (COP) is the amount of heat removed divided by the required energy input to operate the cycle. The higher the COP, the higher is the energy efficiency. COP is directly related to the energy efficiency ratio (EER) that is the efficiency rating for refrigeration or air conditioning equipment at a specific set of internal and external temperatures.

The term "subcooling" refers to the reduction of the temperature of a liquid below that liquid's saturation point for a given pressure. The saturation point is the temperature at which the vapor is completely condensed to a liquid, but subcooling continues to cool the liquid to a lower temperature liquid at the given pressure. By cooling a liquid below the saturation temperature (or bubble point temperature), the net refrigeration capacity can be increased. Subcooling thereby improves refrigeration capacity and energy efficiency of a system. Subcool amount is the amount of cooling below the saturation temperature (in degrees).

Superheat is a term that defines how far above its saturation vapor temperature (the temperature at which, if the composition is cooled, the first drop of liquid is formed, also referred to as the "dew point") a vapor composition is heated.

Temperature glide (sometimes referred to simply as "glide") is the absolute value of the difference between the starting and ending temperatures of a phase-change process by a refrigerant within a component of a refrigerant system, exclusive of any subcooling or superheating. This term may be used to describe condensation or evaporation of a near azeotrope or non-azeotropic composition. When referring to the temperature glide of a refrigeration, air conditioning or heat pump system, it is common to provide the average temperature glide being the average of the temperature glide in the evaporator and the temperature glide in the condenser.

The net refrigeration effect is the quantity of heat that each kilogram of refrigerant absorbs in the evaporator to produce useful cooling.

The mass flow rate is the quantity of refrigerant in kilograms circulating through the refrigeration, heat pump or air conditioning system over a given period of time.

By azeotropic composition is meant a constant-boiling mixture of two or more substances that behave as a single substance. One way to characterize an azeotropic composition is that the vapor produced by partial evaporation or distillation of the liquid has the same composition as the liquid from which it is evaporated or distilled, i.e., the mixture distills/refluxes without compositional change. Constant-boiling compositions are characterized as azeotropic because they exhibit either a maximum or minimum boiling point, as compared with that of the non-azeotropic mixture of the same compounds. An azeotropic composition will not fractionate within a refrigeration or air conditioning system during operation. Additionally, an azeotropic composition will not fractionate upon leakage from a refrigeration or air conditioning system.

An azeotrope-like composition (also commonly referred to as a "near-azeotropic composition") is a substantially constant boiling liquid admixture of two or more substances that behaves essentially as a single substance. One way to characterize an azeotrope-like composition is that the vapor produced by partial evaporation or distillation of the liquid has substantially the same composition as the liquid from which it was evaporated or distilled, that is, the admixture distills/refluxes without substantial composition change. Another way to characterize an azeotrope-like composition is that the bubble point vapor pressure and the dew point vapor pressure of the composition at a particular temperature are substantially the same. Herein, a composition is azeotrope-like if, after 50 weight percent of the composition is removed, such as by evaporation or boiling off, the difference in vapor pressure between the original composition and the composition remaining after 50 weight percent of the original composition has been removed is less than about 10 percent.

A non-azeotropic (also referred to as zeotropic) composition is a mixture of two or more substances that behaves as a simple mixture rather than a single substance. One way to characterize a non-azeotropic composition is that the vapor produced by partial evaporation or distillation of the liquid has a substantially different composition as the liquid from which it was evaporated or distilled, that is, the admixture distills/refluxes with substantial composition change. Another way to characterize a non-azeotropic composition is that the bubble point vapor pressure and the dew point vapor pressure of the composition at a particular temperature are substantially different. Herein, a composition is non-azeotropic if, after 50 weight percent of the composition is removed, such as by evaporation or boiling off, the difference in vapor pressure between the original composition and the composition remaining after 50 weight percent of the original composition has been removed is greater than about 10 percent.

As used herein, the term "lubricant" means any material added to a composition or a compressor (and in contact with any heat transfer composition in use within any heat transfer system) that provides lubrication to the compressor to aid in preventing parts from seizing.

As used herein, compatibilizers are compounds which improve solubility of the hydrofluorocarbon of the disclosed compositions in heat transfer system lubricants. In some embodiments, the compatibilizers improve oil return to the compressor. In some embodiments, the composition is used with a system lubricant to reduce oil-rich phase viscosity.

As used herein, oil-return refers to the ability of a heat transfer composition to carry lubricant through a heat transfer system and return it to the compressor. That is, in use, it is not uncommon for some portion of the compressor lubricant to be carried away by the heat transfer composition from the compressor into the other portions of the system. In such systems, if the lubricant is not efficiently returned to the compressor, the compressor will eventually fail due to lack of lubrication.

As used herein, "ultra-violet" dye is defined as a UV fluorescent or phosphorescent composition that absorbs light in the ultra-violet or "near" ultra-violet region of the electromagnetic spectrum. The fluorescence produced by the UV fluorescent dye under illumination by a UV light that emits at least some radiation with a wavelength in the range of from 10 nanometers to about 775 nanometers may be detected.

Flammability is a term used to mean the ability of a composition to ignite and/or propagate a flame. For refrigerants and other heat transfer compositions, the lower flammability limit ("LFL") is the minimum concentration of the heat transfer composition in air that is capable of propagating a flame through a homogeneous mixture of the composition and air under test conditions specified in ASTM (American Society of Testing and Materials) E681. The upper flammability limit ("UFL") is the maximum concentration of the heat transfer composition in air that is capable of propagating a flame through a homogeneous mixture of the composition and air under the same test conditions. In order to be classified by ASHRAE (American Society of Heating, Refrigerating and Air-Conditioning Engineers) as non-flammable, a refrigerant must be non-flammable under the conditions of ASTM E681 as formulated in the liquid and vapor phase as well as non-flammable in both the liquid and vapor phases that result during leakage scenarios.

ASHRAE also assigns a "lower flammable" rating, Class 2L flammability, to compositions that have a burning velocity lower than 10 cm/sec. Burning velocity can be estimated by comparison to the known burning velocity of R-32 (difluoromethane) or R-152a (1,1-difluoroethane).

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100 year time horizon is commonly the value referenced. For mixtures, a weighted average can be calculated based on the individual GWPs for each component.

Ozone depletion potential (ODP) is a number that refers to the amount of ozone depletion caused by a substance. The ODP is the ratio of the impact on ozone of a chemical compared to the impact of a similar mass of CFC-11 (fluorotrichloromethane). Thus, the ODP of CFC-11 is defined to be 1.0. Other CFCs and HCFCs have ODPs that range from 0.01 to 1.0. HFCs have zero ODP because they do not contain chlorine.

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do materially affect the basic and novel characteristic(s) of the claimed invention. The term 'consisting essentially of' occupies a middle ground between "comprising" and 'consisting of'. Typically, components of the refrigerant mixtures and the refrigerant mixtures themselves can contain minor amounts (e.g., less than about 0.5 weight percent total) of impurities and/or byproducts (e.g., from the manufacture of the refrigerant components or reclamation of the refrigerant components from other systems) which do not materially affect the novel and basic characteristics of the refrigerant mixture.

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the disclosed compositions, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

2,3,3,3-tetrafluoropropene may also be referred to as HFO-1234yf, HFC-1234yf, or R1234yf. HFO-1234yf may be made by methods known in the art, such as by dehydrofluorination 1,1,1,2,3-pentafluoropropane (HFC-245eb) or 1,1,1,2,2-pentafluoropropane (HFC-245cb).

Difluoromethane (HFC-32 or R-32) is commercially available or may be made by methods known in the art, such as by dechlorofluorination of methylene chloride.

Pentafluoroethane (HFC-125 or R125) is commercially available or may be made by methods known in the art, such as dechlorofluorination of 2,2-dichloro-1,1,1-trifluoroethane as described in U.S. Pat. No. 5,399,549, incorporated herein by reference.

Compositions

The refrigerants industry is struggling to develop new refrigerant products that provide good performance and environmental sustainability. Many applications require non-flammable refrigerant compositions and new global warming regulations may place a cap on global warming potential (GWP) for new refrigerant compositions. Thus, the industry must find non-flammable, low GWP (how low is still in question), low-toxicity, low ozone depletion potential (ODP) along with good performance for cooling and heating. Refrigeration systems may require refrigerant compositions with all these characteristics including GWP of less than 2150.

Currently available hydrofluorocarbon (HFC) refrigerants such as R-404A have relatively high GWP, 3922. Certain alternative refrigerants, R-407A and R-407F have lower GWP, 2107 and 1825, respectively, but are lacking in other performance characteristics, such as acceptable compressor discharge temperature. Thus, equipment manufacturers are looking for better overall performance along with lower GWP.

Disclosed herein are refrigerant compositions that in one embodiment comprise 11-28 weight percent difluoromethane; 34-59 weight percent pentafluoroethane; and 21-38 weight percent 2,3,3,3-tetrafluoropropene. In another embodiment, the refrigerant compositions comprise 11-22 weight percent difluoromethane; 46-59 weight percent pentafluoroethane; and 21-35 weight percent 2,3,3,3-tetrafluoropropene. In another embodiment, the refrigerant compositions comprise 11-22 weight percent difluoromethane; 46-59 weight percent pentafluoroethane; and 25-38 weight percent 2,3,3,3-tetrafluoropropene. In another embodiment, the refrigerant compositions comprise 11-28 weight percent difluoromethane; 35-59 weight percent pentafluoroethane; and 21-38 weight percent 2,3,3,3-tetrafluoropropene. In another embodiment, the refrigerant compositions comprise 11-28 weight percent difluoromethane; 36-59 weight percent pentafluoroethane; and 21-38 weight percent 2,3,3,3-tetrafluoropropene.

In reference to FIG. 1, the compositions as described herein are shown on this triangular diagram. Note that all ranges described above fall on the non-flammable side of the line drawn from point A to point B. Thus, all the compositions as described above as different ranges fall within the non-flammable range of compositions comprising difluoromethane, pentafluoroethane and 2,3,3,3-tetrafluoropropene.

In one embodiment, the refrigerant compositions comprising 11-28 weight percent difluoromethane; 34-59 weight percent pentafluoroethane; and 21-38 weight percent 2,3,3,3-tetrafluoropropene are, non-flammable as formulated and determined by ASTM E681 at 60° C. In another embodiment, the refrigerant compositions comprising 11-22 weight percent difluoromethane; 46-59 weight percent pentafluoroethane; and 21-35 weight percent 2,3,3,3-tetrafluoropropene are, non-flammable as formulated and after fractionation as determined by ASTM E681 at 60° C.

In one embodiment, the global warming potential of the compositions described herein is less than 2150.

In some embodiments the refrigerant composition has average temperature glide of about 4 K or less when used in refrigeration equipment. In some embodiments the refrigerant composition has average temperature glide from 0.5 to 4 K when used in refrigeration equipment. In some embodiment, the refrigerant composition is non-flammable and has average temperature glide of about 4 K or less when used in refrigeration equipment. In some embodiment, the refrigerant composition is non-flammable and has average temperature glide of about 4 K or less when used in refrigeration equipment. In some embodiment, the refrigerant composition has average temperature glide of about 4 K or less when used in refrigeration equipment and has global warming potential (GWP) less than 2150. In some embodiment, the refrigerant composition is non-flammable, has average temperature glide of about 4 K or less when used in refrigeration equipment, and has global warming potential (GWP) less than 2150.

In some embodiments, in addition to the difluoromethane, pentafluoroethane, and tetrafluoropropene, the disclosed compositions may comprise optional non-refrigerant components.

In some embodiments, the optional non-refrigerant components (also referred to herein as additives) in the compositions disclosed herein may comprise one or more components selected from the group consisting of lubricants, dyes (including UV dyes), solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof. Indeed, many of these optional non-refrigerant components fit into one or more of these categories and may have qualities that lend themselves to achieve one or more performance characteristic.

In some embodiments, one or more non-refrigerant components are present in small amounts relative to the overall composition. In some embodiments, the amount of additive(s) concentration in the disclosed compositions is from less than about 0.1 weight percent to as much as about 5 weight percent of the total composition. In some embodiments of the present invention, the additives are present in the disclosed compositions in an amount between about 0.1 weight percent to about 5 weight percent of the total composition or in an amount between about 0.1 weight percent to about 3.5 weight percent. The additive component(s) selected for the disclosed composition is selected on the basis of the utility and/or individual equipment components or the system requirements.

In some embodiments, the lubricant is a mineral oil lubricant. In some embodiments, the mineral oil lubricant is selected from the group consisting of paraffins (including straight carbon chain saturated hydrocarbons, branched carbon chain saturated hydrocarbons, and mixtures thereof), naphthenes (including saturated cyclic and ring structures), aromatics (those with unsaturated hydrocarbons containing one or more ring, wherein one or more ring is characterized by alternating carbon-carbon double bonds) and non-hydrocarbons (those molecules containing atoms such as sulfur, nitrogen, oxygen and mixtures thereof), and mixtures and combinations of thereof.

Some embodiments may contain one or more synthetic lubricant. In some embodiments, the synthetic lubricant is selected from the group consisting of alkyl substituted aromatics (such as benzene or naphthalene substituted with linear, branched, or mixtures of linear and branched alkyl groups, often generically referred to as alkylbenzenes), synthetic paraffins and naphthenes, poly (alpha olefins), polyglycols (including polyalkylene glycols), dibasic acid esters, polyesters, polyol esters, neopentyl esters, polyvinyl ethers (PVEs), silicones, silicate esters, fluorinated compounds, phosphate esters, polycarbonates and mixtures thereof, meaning mixtures of the any of the lubricants disclosed in this paragraph.

The lubricants as disclosed herein may be commercially available lubricants. For instance, the lubricant may be paraffinic mineral oil, sold by BVA Oils as BVM 100 N, naphthenic mineral oils sold by Crompton Co. under the trademarks Suniso® 1GS, Suniso® 3GS and Suniso® 5GS, naphthenic mineral oil sold by Pennzoil under the trademark Sontex® 372LT, naphthenic mineral oil sold by Calumet Lubricants under the trademark Calumet® RO-30, linear alkylbenzenes sold by Shrieve Chemicals under the trademarks Zerol® 75, Zerol® 150 and Zerol® 500 and branched alkylbenzene sold by Nippon Oil as HAB 22, polyol esters (POEs) sold under the trademark Castrol® 100 by Castrol, United Kingdom, polyalkylene glycols (PAGs) such as RL-488A from Dow (Dow Chemical, Midland, Mich.), and mixtures thereof, meaning mixtures of any of the lubricants disclosed in this paragraph.

The lubricants used with the present invention may be designed for use with hydrofluorocarbon refrigerants and may be miscible with compositions as disclosed herein under compression refrigeration and air-conditioning apparatus' operating conditions. In some embodiments, the lubricants are selected by considering a given compressor's requirements and the environment to which the lubricant will be exposed.

In the compositions of the present invention including a lubricant, the lubricant is present in an amount of less than 20.0 weight percent to the total composition. In other embodiments, the amount of lubricant is less than 10 weight percent of the total composition. In other embodiments, the about of lubricant is between about 0.1 and 5.0 weight percent of the total composition.

Notwithstanding the above weight ratios for compositions disclosed herein, it is understood that in some heat transfer systems, while the composition is being used, it may acquire additional lubricant from one or more equipment components of such heat transfer system. For example, in some refrigeration, air conditioning and heat pump systems, lubricants may be charged in the compressor and/or the compressor lubricant sump. Such lubricant would be in addition to any lubricant additive present in the refrigerant in such a system. In use, the refrigerant composition when in the compressor may pick up an amount of the equipment lubricant to change the refrigerant-lubricant composition from the starting ratio.

In such heat transfer systems, even when the majority of the lubricant resides within the compressor portion of the system, the entire system may contain a total composition with as much as about 75 weight percent to as little as about 1.0 weight percent of the composition being lubricant. In some systems, for example supermarket refrigerated display cases, the system may contain about 3 weight percent lubricant (over and above any lubricant present in the refrigerant composition prior to charging the system) and 97 weight percent refrigerant.

The non-refrigerant component used with the compositions of the present invention may include at least one dye. The dye may be at least one ultra-violet (UV) dye. The UV dye may be a fluorescent dye. The fluorescent dye may be selected from the group consisting of naphthalimides, perylenes, coumarins, anthracenes, phenanthracenes, xanthenes, thioxanthenes, naphthoxanthenes, fluoresceins, and derivatives of said dye, and combinations thereof, meaning mixtures of any of the foregoing dyes or their derivatives disclosed in this paragraph.

In some embodiments, the disclosed compositions contain from about 0.001 weight percent to about 1.0 weight percent UV dye. In other embodiments, the UV dye is present in an amount of from about 0.005 weight percent to about 0.5 weight percent; and in other embodiments, the UV dye is present in an amount of from 0.01 weight percent to about 0.25 weight percent of the total composition.

UV dye is a useful component for detecting leaks of the composition by permitting one to observe the fluorescence of the dye at or in the vicinity of a leak point in an apparatus (e.g., refrigeration unit, air-conditioner or heat pump). The UV emission, e.g., fluorescence from the dye may be observed under an ultra-violet light. Therefore, if a composition containing such a UV dye is leaking from a given point in an apparatus, the fluorescence can be detected at the leak point, or in the vicinity of the leak point.

Another non-refrigerant component which may be used with the compositions of the present invention may include at least one solubilizing agent selected to improve the solubility of one or more dye in the disclosed compositions. In some embodiments, the weight ratio of dye to solubilizing agent ranges from about 99:1 to about 1:1. The solubilizing agents include at least one compound selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers and 1,1,1-trifluoroalkanes and mixtures thereof, meaning mixtures of any of the solubilizing agents disclosed in this paragraph.

In some embodiments, the non-refrigerant component comprises at least one compatibilizer to improve the compatibility of one or more lubricants with the disclosed compositions. The compatibilizer may be selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers, 1,1,1-trifluoroalkanes, and mixtures thereof, meaning mixtures of any of the compatibilizers disclosed in this paragraph.

The solubilizing agent and/or compatibilizer may be selected from the group consisting of hydrocarbon ethers consisting of the ethers containing only carbon, hydrogen and oxygen, such as dimethyl ether (DME) and mixtures thereof, meaning mixtures of any of the hydrocarbon ethers disclosed in this paragraph.

The compatibilizer may be linear or cyclic aliphatic or aromatic hydrocarbon compatibilizer containing from 6 to 15 carbon atoms. The compatibilizer may be at least one hydrocarbon, which may be selected from the group consisting of at least hexanes, octanes, nonane, and decanes, among others. Commercially available hydrocarbon compatibilizers include but are not limited to those from Exxon Chemical (USA) sold under the trademarks Isopar® H, a mixture of undecane ($C_{11}$) and dodecane ($C_{12}$) (a high purity $C_{11}$ to $C_{12}$ iso-paraffinic), Aromatic 150 (a $C_9$ to $C_{11}$ aromatic) (Aromatic 200 (a $C_9$ to $C_{15}$ aromatic) and Naptha 140 (a mixture of $C_5$ to $C_{11}$ paraffins, naphthenes and aromatic hydrocarbons) and mixtures thereof, meaning mixtures of any of the hydrocarbons disclosed in this paragraph.

The compatibilizer may alternatively be at least one polymeric compatibilizer. The polymeric compatibilizer may be a random copolymer of fluorinated and non-fluorinated acrylates, wherein the polymer comprises repeating units of at least one monomer represented by the formulae $CH_2$=$C(R^1)CO_2R^2$, $CH_2$=$C(R^3)C_6H_4R^4$, and $CH_2$=$C(R^5)C_6H_4XR^6$, wherein X is oxygen or sulfur; $R^1$, $R^3$, and $R^5$ are independently selected from the group consisting of H and $C_1$-$C_4$ alkyl radicals; and $R^2$, $R^4$, and $R^6$ are independently selected from the group consisting of carbon-chain-based radicals containing C, and F, and may further contain H, Cl, ether oxygen, or sulfur in the form of thioether, sulfoxide, or sulfone groups and mixtures thereof. Examples of such polymeric compatibilizers include those commercially available from E. I. du Pont de Nemours and Company, (Wilmington, Del., 19898, USA) under the trademark Zonyl® PHS. Zonyl® PHS is a random copolymer made by polymerizing 40 weight percent $CH_2$=$C(CH_3)CO_2CH_2CH_2(CF_2CF_2)_mF$ (also referred to as Zonyl® fluoromethacrylate or ZFM) wherein m is from 1 to 12, primarily 2 to 8, and 60 weight percent lauryl methacrylate ($CH_2$=$C(CH_3)CO_2(CH_2)_{11}CH_3$, also referred to as LMA).

In some embodiments, the compatibilizer component contains from about 0.01 to 30 weight percent (based on total amount of compatibilizer) of an additive which reduces the surface energy of metallic copper, aluminum, steel, or other metals and metal alloys thereof found in heat exchangers in a way that reduces the adhesion of lubricants to the metal. Examples of metal surface energy reducing additives include those commercially available from DuPont under the trademarks Zonyl® FSA, Zonyl® FSP, and Zonyl® FSJ.

Another non-refrigerant component which may be used with the compositions of the present invention may be a metal surface deactivator. The metal surface deactivator is selected from the group consisting of areoxalyl bis (benzylidene) hydrazide (CAS reg no. 6629-10-3), N,N'-bis(3, 5-di-tert-butyl-4-hydroxyhydrocinnamoylhydrazine (CAS reg no. 32687-78-8), 2,2,'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7) and ethylenediaminetetra-acetic acid (CAS reg no. 60-00-4) and its salts, and mixtures thereof, meaning mixtures of any of the metal surface deactivators disclosed in this paragraph.

The non-refrigerant component used with the compositions of the present invention may alternatively be a stabilizer selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof, meaning mixtures of any of the stabilizers disclosed in this paragraph.

The stabilizer may be selected from the group consisting of tocopherol; hydroquinone; t-butyl hydroquinone; monothiophosphates; and dithiophosphates, commercially available from Ciba Specialty Chemicals, Basel, Switzerland, hereinafter "Ciba", under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168 and Tris-(di-tert-butylphenyl)phosphite, commercially available from Ciba under the trademark Irgafos® OPH; (Di-n-octyl phosphite); and iso-decyl diphenyl phosphite, commercially available from Ciba under the trademark Irgafos® DDPP; trialkyl phosphates, such as trimethyl phosphate, triethylphosphate, tributyl phosphate, trioctyl phosphate, and tri(2-ethylhexyl)phosphate; triaryl phosphates including triphenyl phosphate, tricresyl phosphate, and trixylenyl phosphate; and mixed alkyl-aryl phosphates including isopropylphenyl phosphate (IPPP), and bis(t-butylphenyl)phenyl phosphate (TBPP); butylated triphenyl phosphates, such as those commercially available under the trademark Syn-O-Ad® including Syn-O-Ad® 8784; tert-butylated triphenyl phosphates such as those commercially available under the trademark Durad®620; isopropylated triphenyl phosphates such as those commercially available under the trademarks Durad® 220 and Durad® 110; anisole; 1,4-dimethoxybenzene; 1,4-diethoxybenzene; 1,3,5-trimethoxybenzene; myrcene, alloocimene, limonene (in particular, d-limonene); retinal; pinene; menthol; geraniol; farnesol; phytol; Vitamin A; terpinene; delta-3-carene; terpinolene; phellandrene; fenchene; dipentene; caratenoids, such as lycopene, beta carotene, and xanthophylls, such as zeaxanthin; retinoids, such as hepaxanthin and isotretinoin; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and mixtures and combinations thereof.

The additive used with the compositions of the present invention may alternatively be an ionic liquid stabilizer. The ionic liquid stabilizer may be selected from the group consisting of organic salts that are liquid at room temperature (approximately 25° C.), those salts containing cations selected from the group consisting of pyridinium, pyridazinium, pyrimidinium, pyrazinium, imidazolium, pyrazolium, thiazolium, oxazolium and triazolium and mixtures thereof; and anions selected from the group consisting of [$BF_4$]—, [$PF_6$]—, [$SbF_6$]—, [$CF_3SO_3$]—, [$HCF_2CF_2SO_3$]—, [$CF_3HFCCF_2SO_3$]—, [$HCClFCF_2SO_3$]—, [$(CF_3SO_2)_2N$]—, [$(CF_3CF_2SO_2)_2N$]—, [$(CF_3SO_2)_3C$]—, [$CF_3CO_2$]—, and F— and mixtures thereof. In some embodiments, ionic liquid stabilizers are selected from the group consisting of emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

In some embodiments, the stabilizer may be a hindered phenol, which is any substituted phenol compound, including phenols comprising one or more substituted or cyclic, straight chain, or branched aliphatic substituent group, such as, alkylated monophenols including 2,6-di-tert-butyl-4-methylphenol; 2,6-di-tert-butyl-4-ethylphenol; 2,4-dimethyl-6-tertbutylphenol; tocopherol; and the like, hydroquinone and alkylated hydroquinones including t-butyl hydroquinone, other derivatives of hydroquinone; and the like, hydroxylated thiodiphenyl ethers, including 4,4'-thiobis(2-methyl-6-tert-butylphenol); 4,4'-thiobis(3-methyl-6-tertbutylphenol); 2,2'-thiobis(4methyl-6-tert-butylphenol); and the like, alkylidene-bisphenols including: 4,4'-methylenebis(2,6-di-tert-butylphenol); 4,4'-bis(2,6-di-tert-butylphenol); derivatives of 2,2'- or 4,4-biphenoldiols; 2,2'-methylenebis(4-ethyl-6-tertbutylphenol); 2,2'-methylenebis(4-methyl-6-tertbutylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol; 2,2'-methylenebis(4-methyl-6-cyclohexylphenol, 2,2- or 4,4-biphenyldiols including 2,2'-methylenebis(4-ethyl-6-tert-butylphenol); butylated hydroxytoluene (BHT, or 2,6-di-tert-butyl-4-methylphenol), bisphenols comprising heteroatoms including 2,6-di-tert-alpha-dimethylamino-p-cresol, 4,4-thiobis(6-tert-butyl-m-cresol); and the like; acylaminophenols; 2,6-di-tert-butyl-4(N,N'-dimethylaminomethylphenol); sulfides including; bis(3-methyl-4-hydroxy-5-tert-butylbenzyl)sulfide; bis(3,5-di-tert-butyl-4-hydroxybenzyl) sulfide and mixtures thereof, meaning mixtures of any of the phenols disclosed in this paragraph.

The non-refrigerant component which is used with compositions of the present invention may alternatively be a tracer. The tracer may be two or more tracer compounds from the same class of compounds or from different classes of compounds. In some embodiments, the tracer is present in the compositions at a total concentration of about 50 parts per million by weight (ppm) to about 1000 ppm, based on the weight of the total composition. In other embodiments, the tracer is present at a total concentration of about 50 ppm to about 500 ppm. Alternatively, the tracer is present at a total concentration of about 100 ppm to about 300 ppm.

The tracer may be selected from the group consisting of hydrofluorocarbons (HFCs), deuterated hydrofluorocarbons, perfluorocarbons, fluoroethers, brominated compounds, iodated compounds, alcohols, aldehydes and ketones, nitrous oxide and combinations thereof. Alternatively, the tracer may be selected from the group consisting of fluoroethane, 1,1,-difluoroethane, 1,1,1-trifluoroethane, 1,1,1,3, 3,3-hexafluoropropane, 1,1,1,2,3,3,3-heptafluoropropane, 1,1,1,3,3-pentafluoropropane, 1,1,1,3,3-pentafluorobutane, 1,1,1,2,3,4,4,5,5,5-decafluoropentane, 1,1,1,2,2,3,4,5,5,6,6,7,7,7-tridecafluoroheptane, iodotrifluoromethane, deuterated hydrocarbons, deuterated hydrofluorocarbons, perfluorocarbons, fluoroethers, brominated compounds, iodated compounds, alcohols, aldehydes, ketones, nitrous oxide ($N_2O$) and mixtures thereof. In some embodiments, the tracer is a blend containing two or more hydrofluorocarbons, or one hydrofluorocarbon in combination with one or more perfluorocarbons.

The tracer may be added to the compositions of the present invention in predetermined quantities to allow detection of any dilution, contamination or other alteration of the composition.

The additive which may be used with the compositions of the present invention may alternatively be a perfluoropolyether as described in detail in US2007-0284555, incorporated herein by reference.

It will be recognized that certain of the additives referenced above as suitable for the non-refrigerant component have been identified as potential refrigerants. However in accordance with this invention, when these additives are used, they are not present at an amount that would affect the novel and basic characteristics of the refrigerant mixtures of this invention. Preferably, the refrigerant mixtures and the compositions of this invention containing them, contain no more than about 0.5 weight percent of the refrigerants other than HFC-32, HFC-125, and HFO-1234yf.

In one embodiment, the compositions disclosed herein may be prepared by any convenient method to combine the desired amounts of the individual components. A preferred method is to weigh the desired component amounts and thereafter combine the components in an appropriate vessel. Agitation may be used, if desired.

Compositions of the present invention have zero ozone depletion potential and low global warming potential (GWP). Additionally, the compositions of the present invention will have global warming potentials that are less than many hydrofluorocarbon refrigerants currently in use. One aspect of the present invention is to provide a refrigerant with a global warming potential of less than 1000.

Apparatus and Methods of Use

The compositions disclosed herein are useful as heat transfer compositions or refrigerants. In particular, the refrigerant compositions comprising HFC-32, HFC-125, and HFO-1234yf are useful as refrigerants. Also, the refrigerant compositions comprising HFC-32, HFC-125, and HFO-1234yf are useful as replacements for R-404A or R-507A in refrigeration systems. In particular, the refrigerant compositions comprising HFC-32, HFC-125, and HFO-1234yf are useful as replacements for R-404A or R-507A in transport refrigeration systems. A transport refrigeration system is a mobile system designed for transport over the road, rail, sea or air that is also designed to keep perishable goods cold or frozen during transport.

Thus, disclosed herein is a method of producing cooling comprising evaporating a refrigerant composition comprising HFC-32, HFC-125, and HFO-1234yf in the vicinity of a body to be cooled and thereafter condensing said composition.

In some embodiments the present method provides average temperature glide of about 4 K or less when used in refrigeration equipment. In some embodiments the present method provides average temperature glide from 0.5 to 4 K when used in refrigeration equipment.

Vapor-compression air conditioning and heat pump systems include an evaporator, a compressor, a condenser, and an expansion device. A refrigeration cycle re-uses refrigerant in multiple steps producing a cooling effect in one step and a heating effect in a different step. The cycle can be described simply as follows. Liquid refrigerant enters an evaporator through an expansion device, and the liquid refrigerant boils in the evaporator, by withdrawing heat from the environment, at a low temperature to form a gas and produce cooling. Often air or a heat transfer fluid flows over or around the evaporator to transfer the cooling effect caused by the evaporation of the refrigerant in the evaporator to a body to be cooled. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle.

Thus, disclosed herein is a refrigeration system comprising an evaporator, compressor, condenser and an expansion device; wherein said system contains a refrigerant composition comprising HFC-32, HFC-125, and HFO-1234yf.

In one embodiment, of the refrigeration system, the compressor discharge temperature is within 20 K of the compressor discharge temperature when R-404A is run at the same operating conditions.

In one embodiment, of the refrigeration system, the compressor discharge temperature is within 10K of the compressor discharge temperature when R-404A is run at the same operating conditions.

In another embodiment, of the refrigeration system, the compressor discharge temperature is lower than the compressor discharge temperature when either R-407A or R-407F is run at the same operating conditions.

In another embodiment, of the refrigeration system, the compressor discharge temperature is 110° C. or less.

In another embodiment, of the refrigeration system, the mass flow is within 10% of the mass flow when R-404A is run at the same operating conditions. The closer the mass flow for a new refrigerant to the mass flow the system was designed for (say for R-404A), the less adjustment is necessary to the thermal expansion valve (TXV), and thus, the easier the retrofit to the new refrigerant.

A method is provided for replacing R-404A in refrigeration systems comprising replacing said R-404A with a refrigerant composition comprising HFC-32, HFC-125, and HFO-1234yf to said refrigeration system in place of R-404A. In one embodiment, the refrigeration system is a stationary refrigeration system. In another embodiment the refrigeration system is a mobile refrigeration system. In another embodiment the refrigeration system is a transport refrigeration unit.

A method is provided for replacing R-507A in refrigeration systems comprising replacing said R-507A with a refrigerant composition comprising HFC-32, HFC-125, and HFO-1234yf to said air conditioning system in place of R-507A. In one embodiment, the refrigeration system is a stationary refrigeration system. In another embodiment the refrigeration system is a mobile refrigeration system. In another embodiment the refrigeration system is a transport refrigeration unit.

A body to be cooled may be defined as any space, location, object or body for which it is desirable to provide cooling. Examples include spaces (open or enclosed) requiring refrigeration or cooling, such as supermarket display cases (refrigerated or freezer cases) and refrigerated transport units.

By vicinity is meant that the evaporator of the system containing the refrigerant mixture is located either within or adjacent to the body to be cooled or heated, such that air moving over the evaporator would move into or around the body to be cooled or heated.

In some embodiments, the refrigerant mixtures as disclosed herein may be useful in particular in transport refrigeration systems, supermarket systems, walk-in coolers and freezers, self-contained coolers and freezers, and ice machines. Additionally, in some embodiments, the disclosed compositions may function as primary refrigerants in secondary loop systems that provide cooling to remote locations by use of a secondary heat transfer fluid, which may comprise water, a glycol, carbon dioxide, or a fluorinated hydrocarbon fluid. In this case the secondary heat transfer fluid is the body to be cooled as it is adjacent to the evaporator and is cooled before moving to a second remote body to be cooled.

The compositions disclosed herein may be useful as low GWP (global warming potential) replacements for currently used refrigerants, including R-404A (ASHRAE designation for a mixture of HFC-134a, HFC-125 and HFC-143a, at 4.0, 44, and 52 weight percent respectfully) and R-507A (ASHRAE designation for a mixture of HFC-125 and HFC-143a, at 50 and 50 weight percent respectfully).

Often replacement refrigerants are most useful if capable of being used in the original refrigeration equipment designed for a different refrigerant. Additionally, the compositions as disclosed herein may be useful as replacements for R-404A in equipment designed for R-404A with minimal to no system modifications. Further, the compositions as disclosed herein comprising HFC-32, HFC-125, and HFO-1234yf may be useful for replacing R-404A in equipment specifically modified for or produced entirely for these new compositions comprising HFC-32, HFC-125, and HFO-1234yf.

Further, the compositions as disclosed herein may be useful as replacements for R-507A in equipment designed for R-507A with minimal to no system modifications. Further, the compositions as disclosed herein comprising HFC-32, HFC-125, and HFO-1234yf may be useful for replacing R-507A in equipment specifically modified for or produced entirely for these new compositions comprising HFC-32, HFC-125, and HFO-1234yf.

In many applications, some embodiments of the disclosed compositions are useful as refrigerants and provide at least comparable cooling performance (meaning cooling capacity and energy efficiency) as the refrigerant for which a replacement is being sought.

In another embodiment is provided a method for replacing R-404A. The method comprises charging a refrigeration apparatus with a refrigerant mixture comprising HFC-32, HFC-125, and HFO-1234yf as described herein. In one embodiment the refrigeration apparatus is suitable for use with R-404A. Of note are embodiments wherein the refrigeration apparatus includes systems with evaporating temperatures in the range of from about −50° C. to about 0° C. Preferred evaporating temperature is in the range of about −40° C. to −10° C.

In one embodiment of the method, the refrigeration capacity produced by the refrigerant composition comprising HFC-32, HFC-125 and HFO-1234yf is within about 10% of that produced by R-404A under the same operating conditions.

In another embodiment, the coefficient of performance obtained in the method is within about 5% of that produced by R-404A under the same operating conditions.

In another embodiment, replacing R-404A comprises removing the R-404A from the refrigeration system and charging the system with the refrigerant composition comprising HFC-32, HFC-125, and HFO-1234yf.

In another embodiment, replacing comprises removing the R-404A from the refrigeration system and charging the system with the refrigerant composition comprising HFC-32, HFC-125, and HFO-1234yf.

In another embodiment is provided a method for replacing R-507A. The method comprises charging a refrigeration apparatus with a refrigerant mixture comprising HFC-32, HFC-125, and HFO-1234yf as described herein. In one embodiment the refrigeration apparatus is suitable for use with R-507A. Of note are embodiments wherein the refrigeration apparatus includes systems with evaporating temperatures in the range of from about −50° C. to about 0° C. Preferred evaporating temperature is in the range of about −40° C. to −10° C.

In one embodiment of the method, the refrigeration capacity produced by the refrigerant composition comprising HFC-32, HFC-125 and HFO-1234yf is within about 10% of that produced by R-507A under the same operating conditions.

In another embodiment, the coefficient of performance obtained in the method is within about 5% of that produced by R-507A under the same operating conditions.

In another embodiment, replacing R-507A comprises removing the R-507A from the refrigeration system and charging the system with the refrigerant composition comprising HFC-32, HFC-125, and HFO-1234yf.

In another embodiment is provided a method for recharging a heat transfer system that contains a refrigerant to be replaced and a lubricant, said method comprising removing the refrigerant to be replaced from the heat transfer system while retaining a substantial portion of the lubricant in said system and introducing one of the compositions herein disclosed containing HFC-32, HFC-125, and HFO-1234yf to the heat transfer system.

In one embodiment, there is provided a heat transfer system containing a composition as disclosed herein containing HFC-32, HFC-125, and HFO-1234yf. In another embodiment is disclosed a refrigeration apparatus containing a composition as disclosed herein. In another embodiment, is disclosed a stationary refrigeration apparatus containing a composition as disclosed herein containing HFC-32, HFC-125, and HFO-1234yf. In another particular embodiment, is disclosed a mobile refrigeration apparatus containing the composition of the present invention containing HFC-32, HFC-125, and HFO-1234yf. In another particular embodiment, is disclosed a transport refrigeration apparatus containing the composition of the present invention containing HFC-32, HFC-125, and HFO-1234yf. The apparatus typically includes an evaporator, a compressor, a condenser, and an expansion device.

EXAMPLES

The concepts disclosed herein will be further described in the following examples, which do not limit the scope of the invention described in the claims.

Example 1

Cooling Performance

Cooling performance at low temperature refrigeration conditions for compositions of the present invention is determined and displayed in Tables 1a and 1b as compared to R-404A, R-407A, R-407F, and R-507A. Compressor discharge temperatures, COP (energy efficiency) and cooling capacity (cap) are calculated from physical property measurements for the following specific conditions:

| Evaporator temperature | −35° C. |
|---|---|
| Condenser temperature | 40° C. |
| Subcool amount | 6K |
| Return gas superheat | −15° C. |
| Compressor efficiency | 70% |

GWP has also been calculated based on IPCC AR4 values where available.

TABLE 1a

| Compositions | GWP (AR4) | Avg Glide, K | Disch T (° C.) | Suct P (kPa) | Rel Suct P vs 404A (%) | Disch P (kPa) | Rel Disch P vs 404A | Flammable or non-flammable |
|---|---|---|---|---|---|---|---|---|
| R-404A | 3922 | 0.4 | 90 | 167 | 100 | 1833 | 100 | non-flam |
| R-507 | 3985 | 0.02 | 88 | 174 | 104 | 1880 | 103 | non-flam |
| R-407A (20/40/40 wt %) 32/125/134a | 2107 | 4.3 | 112 | 132 | 79 | 1717 | 94 | non-flam |
| R-407F (30/30/40) 32/125/134a | 1825 | 3.9 | 120 | 153 | 92 | 1905 | 104 | non-flam |
| Compositions, 32/125/1234yf, wt % | | | | | | | | |
| 11/59/30 | 2140 | 2.9 | 92 | 155 | 93 | 1807 | 99 | non-flam |
| 22/57/21 | 2144 | 2.2 | 103 | 181 | 108 | 2033 | 111 | non-flam |
| 28/34/38 | 1381 | 3.6 | 108 | 174 | 104 | 1949 | 106 | non-flam |
| 11/51/38 | 1861 | 3.5 | 92 | 146 | 87 | 1729 | 94 | non-flam |
| 20/50/30 | 1886 | 3.0 | 101 | 168 | 101 | 1926 | 105 | non-flam |
| 19/46/35 | 1740 | 3.5 | 100 | 161 | 96 | 1868 | 102 | non-flam |
| Comparative (32/125/1234yf, wt %) | | | | | | | | |
| 5/20/75 | 737 | 3.3 | 85 | 102 | 61 | 1306 | 71 | flam |
| 50/20/30 | 1039 | 2.0 | 130 | 199 | 119 | 2197 | 120 | flam |
| 50/2/48 | 409 | 3.6 | 129 | 186 | 111 | 2082 | 114 | flam |
| 5/5/90 | 212 | 2.8 | 84 | 91 | 54 | 1196 | 65 | flam |
| 20/10/70 | 488 | 5.7 | 100 | 130 | 78 | 1600 | 87 | flam |
| 30/10/60 | 555 | 5.5 | 109 | 153 | 92 | 1804 | 98 | flam |
| 40/10/50 | 622 | 4.3 | 119 | 174 | 104 | 1981 | 108 | flam |
| 20/60/20 | 2236 | 2.1 | 101 | 180 | 108 | 2021 | 110 | |

TABLE 1a-continued

| Compositions | GWP (AR4) | Avg Glide, K | Disch T (° C.) | Suct P (kPa) | Rel Suct P vs 404A (%) | Disch P (kPa) | Rel Disch P vs 404A | Flammable or non-flammable |
|---|---|---|---|---|---|---|---|---|
| 10/50/40 | 1819 | 3.5 | 91 | 142 | 85 | 1694 | 92 | |
| 20/36/44 | 1397 | 4.2 | 101 | 154 | 92 | 1803 | 98 | flam after leak |
| 50/42/8 | 1808 | 0.5 | 132 | 215 | 129 | 2341 | 128 | |
| 0/21/79 | 738 | 1.6 | 79 | 91 | 54 | 1170 | 64 | flam |
| 0/28.4/71.6 | 997 | 2.0 | 79 | 96 | 57 | 1229 | 67 | |
| 5/24/71 | 877 | 3.4 | 85 | 105 | 63 | 1337 | 73 | flam |
| 40/50/10 | 2020 | 0.8 | 121 | 209 | 125 | 2275 | 124 | |
| 23/25/52 | 1032 | 4.8 | 103 | 150 | 90 | 1777 | 97 | flam |
| 15/45/40 | 1678 | 3.8 | 96 | 150 | 90 | 1769 | 97 | flam after leak |
| 10/60/30 | 2169 | 2.9 | 91 | 154 | 92 | 1792 | 98 | |

TABLE 1b

| Composition | Cap (kJ/m$^3$) | Rel Cap to 404A | COP | COP Rel to 404A | Net Refr (Kj/kg) | Mass Flow at 1 m$^3$/min compres displ (kg/min) | Mass Flow Rel to R404A |
|---|---|---|---|---|---|---|---|
| R-404A | 897 | 100 | 1.46 | 100 | 113.5 | 7.90 | 100 |
| R-507A | 919 | 102 | 1.45 | 99 | 109.98 | 8.36 | 106 |
| R-407A (20/40/40 wt %) 32/125/134a | 834 | 93 | 1.54 | 105 | 146.11 | 5.71 | 72 |
| R-407F (30/30/40) 32/125/134a | 958 | 107 | 1.53 | 105 | 156.51 | 6.12 | 77 |
| Compositions, 32/125/1234yf, wt % | | | | | | | |
| 11/59/30 | 858 | 96 | 1.46 | 100 | 110.43 | 7.77 | 98 |
| 22/57/21 | 1014 | 113 | 1.47 | 101 | 124.82 | 8.12 | 103 |
| 28/34/38 | 989 | 110 | 1.50 | 103 | 138.66 | 7.13 | 90 |
| 11/51/38 | 820 | 91 | 1.47 | 101 | 112.84 | 7.27 | 92 |
| 20/50/30 | 951 | 106 | 1.48 | 101 | 124.19 | 7.66 | 97 |
| 19/46/35 | 917 | 102 | 1.484 | 102 | 124.07 | 7.39 | 94 |
| Comparative (32/125/1234yf, wt %) | | | | | | | |
| 5/20/75 | 604 | 67 | 1.514 | 104 | 113.91 | 5.30 | 67 |
| 50/20/30 | 1194 | 133 | 1.515 | 104 | 172.02 | 6.94 | 88 |
| 50/2/48 | 1123 | 125 | 1.523 | 104 | 175.18 | 6.41 | 81 |
| 5/5/90 | 554 | 62 | 1.531 | 105 | 117.36 | 4.72 | 60 |
| 20/10/70 | 781 | 87 | 1.524 | 104 | 135.1 | 5.78 | 73 |
| 30/10/60 | 916 | 102 | 1.522 | 104 | 147.25 | 6.22 | 79 |
| 40/10/50 | 1041 | 116 | 1.520 | 104 | 159.98 | 6.51 | 82 |
| 20/60/20 | 1000 | 111 | 1.468 | 101 | 121.38 | 8.24 | 104 |
| 10/50/40 | 800 | 89 | 1.474 | 101 | 111.93 | 7.15 | 90 |
| 20/36/44 | 887 | 99 | 1.496 | 103 | 128.09 | 6.92 | 88 |
| 50/42/8 | 1275 | 142 | 1.504 | 103 | 168.86 | 7.55 | 96 |
| 0/21/79 | 536 | 60 | 1.513 | 104 | 106.77 | 5.02 | 64 |
| 0/28.4/71.6 | 561 | 63 | 1.503 | 103 | 105.14 | 5.34 | 68 |
| 5/24/71 | 618 | 69 | 1.509 | 103 | 112.93 | 5.47 | 69 |
| 40/50/10 | 1208 | 135 | 1.494 | 102 | 151.87 | 7.95 | 101 |
| 23/25/52 | 882 | 98 | 1.509 | 103 | 134.76 | 6.54 | 83 |
| 15/45/40 | 853 | 95 | 1.484 | 102 | 119.45 | 7.14 | 90 |
| 10/60/30 | 847 | 94 | 1.459 | 100 | 108.91 | 7.78 | 98 |

The data demonstrates the compressor discharge temperatures of the present invention are significantly lower than R-407A and R-407F and in some cases, only a couple of degrees higher than R-404A and R-507A. In some of the comparative examples, discharge temperatures are also very high. The data also demonstrate the suction and discharge pressure, cooling capacity and mass flow rate are within about 10% of R-404A and R-507A demonstrating that these compositions can be utilized as a direct replacement for R-404A and R-507A with minimal to no modifications to the system. This is not the case for the comparative examples where capacities are in some cases significantly lower or higher than R-404A and R-507A indicating these are not a good match for R-404A or R-507A. The COPs of compositions of the present inventions are 1 to 3% higher than R-404A and R-507A. The temperature glide of compositions of the present invention is also lower than R-407A and R-407F. Some of the comparative examples are also flammable as formulated or become flammable under leakage conditions, whereas compositions of the present invention are non-flammable, both as formulated and under leakage conditions. Additionally, some of the comparative examples have mass flow rate considerably lower than that for R-404A. Thus, use of those compositions would likely require change out of the thermal expansion valve for the system.

Example 2

Cooling Performance

Cooling performance at medium temperature refrigeration conditions for high ambient temperatures for compositions of the present invention is determined and displayed in Tables 2a and 2b as compared to R-22. Compressor discharge temperatures, COP (energy efficiency) and cooling capacity (cap) are calculated from physical property measurements for the following specific conditions:

| | |
|---|---|
| Evaporator temperature | −10° C. |
| Condenser temperature | 40° C. |
| Subcool amount | 6K |
| Return gas superheat | 0° C. |
| Compressor efficiency | 70% |

GWP has also been calculated based on IPCC AR4 values where available.

TABLE 2a

| Composition | GWP (AR4) | Avg Glide, K | Disch T (° C.) | Suct P (kPa) | Rel Suct P vs 404A (%) | Disch P (kPa) | Rel Disch P vs 404A, % | Flammable or non-flammable |
|---|---|---|---|---|---|---|---|---|
| R404A | 3922 | 0.4 | 66 | 436 | 100 | 1833 | 100 | non-flam |
| R407A (20/40/40 wt %) 32/125/134a | 2107 | 4.4 | 79 | 373 | 86 | 1717 | 94 | non-flam |
| R407F (30/30/40) 32/125/134a | 1825 | 4.6 | 85 | 392 | 90 | 1797 | 98 | non-flam |
| Compositions, 32/125/1234yf, wt % | | | | | | | | |
| 11/59/30 | 2140 | 3.1 | 68 | 417 | 96 | 1807 | 99 | non-flam |
| 22/57/21 | 2144 | 2.3 | 74 | 478 | 110 | 2033 | 111 | non-flam |
| 28/34/38 | 1381 | 3.8 | 77 | 453 | 104 | 1949 | 106 | non-flam |
| 11/51/38 | 1861 | 3.7 | 67 | 395 | 91 | 1728 | 94 | non-flam |
| 20/50/30 | 1886 | 3.2 | 73 | 448 | 103 | 1926 | 105 | non-flam |
| Comparative (32/125/1234yf, wt %) | | | | | | | | |
| 5/20/75 | 737 | 3.8 | 63 | 285 | 65 | 1306 | 71 | flam |
| 50/20/30 | 1039 | 2.1 | 90 | 520 | 119 | 2197 | 120 | flam |
| 50/2/48 | 409 | 3.7 | 89 | 488 | 112 | 2082 | 114 | flam |
| 5/5/90 | 212 | 3.2 | 62 | 258 | 59 | 1196 | 65 | flam |
| 20/10/70 | 488 | 6.2 | 72 | 358 | 82 | 1600 | 87 | flam |
| 30/10/60 | 555 | 5.7 | 78 | 413 | 95 | 1804 | 98 | flam |
| 40/10/50 | 622 | 4.5 | 84 | 461 | 106 | 1981 | 108 | flam |
| 20/60/20 | 2236 | 2.3 | 73 | 475 | 109 | 2021 | 110 | |
| 10/50/40 | 1819 | 3.8 | 67 | 386 | 89 | 1694 | 92 | |
| 20/36/44 | 1397 | 4.4 | 72 | 413 | 95 | 1803 | 98 | flam after leak |
| 50/42/8 | 1808 | 0.2 | 92 | 568 | 130 | 2380 | 130 | |
| 0/21/79 | 738 | 1.8 | 59 | 255 | 58 | 1170 | 64 | flam |
| 0/28.4/71.6 | 997 | 2.2 | 59 | 269 | 62 | 1229 | 67 | |
| 5/24/71 | 877 | 3.8 | 63 | 293 | 67 | 1337 | 73% | flam |
| 40/50/10 | 2020 | 0.9 | 85 | 543 | 125 | 2275 | 124 | |
| 23/25/52 | 1032 | 5.1 | 74 | 406 | 93 | 1777 | 97 | flam |
| 15/45/40 | 1678 | 4.0 | 70 | 405 | 93 | 1769 | 97 | flam after leak |
| 10/60/30 | 2169 | 3.1 | 67 | 413 | 95 | 1792 | 98 | |

TABLE 2b

| Composition | Cap (kJ/m³) | Rel Cap to 404A | COP | COP Rel to 404A % | Net Refr (Kj/kg) | Mass Flow at 1 m³/min compres displ (kg/min) | Mass Flow Rel to R404A % |
|---|---|---|---|---|---|---|---|
| R404A | 2504 | 100 | 2.757 | 100 | 121.78 | 20.56 | 100 |
| R407A (20/40/40 wt %) 32/125/134a | 2454 | 98 | 2.878 | 104 | 154.14 | 15.92 | 77 |
| R407F (30/30/40) 32/125/134a | 2615 | 104 | 2.889 | 105 | 171.6 | 15.24 | 74 |
| Compositions, 32/125/1234yf, wt % | | | | | | | |
| 11/59/30 | 2459 | 98 | 2.768 | 100 | 118.45 | 20.76 | 101 |
| 22/57/21 | 2826 | 113 | 2.770 | 100 | 132.26 | 21.37 | 104 |
| 28/34/38 | 2762 | 110 | 2.810 | 102 | 146.32 | 18.88 | 92 |
| 11/51/38 | 2366 | 94 | 2.790 | 101 | 121.06 | 19.54 | 95 |
| 20/50/30 | 2677 | 107 | 2.785 | 101 | 131.92 | 20.29 | 99 |
| Comparative (32/125/1234yf, wt %) | | | | | | | |
| 5/20/75 | 1805 | 72 | 2.865 | 104 | 123.22 | 14.65 | 71 |
| 50/20/30 | 3228 | 129 | 2.818 | 102 | 178.89 | 18.04 | 88 |
| 50/2/48 | 3062 | 122 | 2.833 | 103 | 182.41 | 16.79 | 82 |

TABLE 2b-continued

| Composition | Cap (kJ/m³) | Rel Cap to 404A | COP | COP Rel to 404A % | Net Refr (Kj/kg) | Mass Flow at 1 m³/min compres displ (kg/min) | Mass Flow Rel to R404A % |
|---|---|---|---|---|---|---|---|
| 5/5/90 | 1664 | 66 | 2.889 | 105 | 127.00 | 13.10 | 64 |
| 20/10/70 | 2266 | 90 | 2.867 | 104 | 143.74 | 15.76 | 77 |
| 30/10/60 | 2587 | 103 | 2.850 | 103 | 155.33 | 16.65 | 81 |
| 40/10/50 | 2875 | 115 | 2.834 | 103 | 167.54 | 17.16 | 83 |
| 20/60/20 | 2794 | 112 | 2.763 | 100 | 128.86 | 21.68 | 105 |
| 10/50/40 | 2316 | 92 | 2.793 | 101 | 120.24 | 19.26 | 94 |
| 20/36/44 | 2523 | 101 | 2.815 | 102 | 136.15 | 18.53 | 90 |
| 50/42/8 | 3483 | 139 | 2.792 | 101 | 174.52 | 19.96 | 97 |
| 0/21/79 | 1613 | 64 | 2.870 | 104 | 116.36 | 13.86 | 67 |
| 0/28.4/71.6 | 2685 | 107 | 2.855 | 104 | 114.57 | 23.44 | 114 |
| 5/24/71 | 1845 | 74 | 2.857 | 104 | 122.15 | 15.10 | 73 |
| 40/50/10 | 3275 | 131 | 2.786 | 101 | 158.58 | 20.65 | 100 |
| 23/25/52 | 2510 | 100 | 2.833 | 103 | 142.89 | 17.57 | 85 |
| 15/45/40 | 2446 | 98 | 2.800 | 102 | 127.57 | 19.17 | 93 |
| 10/60/30 | 2433 | 97 | 2.766 | 100 | 116.96 | 20.80 | 101 |

The data demonstrates the compressor discharge temperatures of the present invention are significantly lower than R-407A and R-407F and in some cases, only a couple of degrees higher than R-404A and R-507A. In some of the comparative examples, discharge temperatures are also very high. The data also demonstrate the suction and discharge pressure, cooling capacity and mass flow rate are within about 10% of R-404A and R-507A demonstrating that these compositions can be utilized as a direct replacement for R-404A and R-507A with minimal to no modifications to the system. This is not the case for the comparative examples where capacities are in some cases significantly lower or higher than R-404A and R-507A indicating these are not good matches for R-404A. The COPs of compositions of the present inventions are 1 to 3% higher than R-404A and R-507A. The temperature glide of compositions of the present invention is also lower than R-407A and R-407F. Some of the comparative examples are also flammable as formulated or become flammable under leakage conditions, whereas compositions of the present invention are non-flammable, both as formulated and under leakage conditions.

Example 3

Flame Boundaries for Compositions

The flammability limits were determined for binary compositions of HFC-32 and HFC-125 and also HFC-125 and HFO-1234yf. The measurements were made following the procedures described in a standard method of the American Society of Testing and Materials (ASTM). ASTM-E681-04 was used for these measurements done at 60° C. and 50% relative humidity. Results are shown in Table 3.

TABLE 3

| Composition | Flammable or Non-flammable | Points on FIG. 1 Triangle Diagram |
|---|---|---|
| HFC-32/HFC-125, 60/40 wt % | Non-flammable | A |
| HFO-1234yf/HFC-125, 72/28 wt % | Non-flammable | B |

Data points A and B are the compositions with the highest level of the flammable component (either HFC-32 or HFO-1234yf) that was found to be non-flammable. Therefore, those compositions containing HFC-32 and HFC-125 with higher than 60 wt % HFC-32, will be flammable. Likewise, those compositions containing HFO-1234yf and HFC-125 with higher than 72 wt % HFO-1234yf will be flammable. With reference to FIG. 1, when the two binary composition points (A & B) are plotted on a triangular diagram showing concentrations for all 3 components of the present invention, the line connecting these points indicates the flammability limit for the 3 component system.

Selected Embodiments

Embodiment A1

A refrigerant composition comprising 11-28 weight percent difluoromethane; 34-59 weight percent pentafluoroethane; and 21-38 weight percent 2,3,3,3-tetrafluoropropene.

Embodiment A2

The refrigerant composition of Embodiment A1 comprising 11-22 weight percent difluoromethane; 46-59 weight percent pentafluoroethane; and 21-35 weight percent 2,3,3,3-tetrafluoropropene.

Embodiment A3

The refrigerant composition of any of Embodiments A1-A2, wherein the composition is non-flammable as formulated and determined by ASTM E681 at 60° C.

Embodiment A4

The refrigerant composition of any of Embodiments A1-A3, wherein the composition is non-flammable as formulated and after fractionation as determined by ASTM E681 at 60° C.

Embodiment A5

The composition of any of Embodiments A1-A4, wherein the global warming potential of the composition is less than 2150.

Embodiment A6

The composition of any of Embodiments A1-A5, wherein said refrigerant composition has average temperature glide of 4 K or less when used in refrigeration equipment.

Embodiment A7

The composition of any of Embodiments A1-A6, further comprising one or more components selected from the group consisting of lubricants, dyes, solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof.

Embodiment B1

A refrigeration system comprising an evaporator, a condenser, a compressor and an expansion device, wherein the system contains the composition of any of Embodiments A1-A7.

Embodiment B2

The refrigeration system of Embodiment B1, wherein the compressor discharge temperature is within 20 K of the compressor discharge temperature when R-404A is run at the same operating conditions.

Embodiment B3

The refrigeration system of any of Embodiments B1-B2, wherein the compressor discharge temperature is within 10 K of the compressor discharge temperature when R-404A is run at the same operating conditions.

Embodiment B4

The refrigeration system of any of Embodiments B1-B3, wherein the compressor discharge temperature is lower than the compressor discharge temperature when either R-407A or R-407F is run at the same operating conditions.

Embodiment B5

The refrigeration system of any of Embodiments B1-B4, wherein the average temperature glide in the condenser and evaporator is less than 4.0 K.

Embodiment B6

The refrigeration system of any of Embodiments B1-B5, wherein the average temperature glide in the condenser and evaporator is from about 0.5 to about 4.0 K.

Embodiment B7

The refrigeration system of any of Embodiments B1-B6, wherein the mass flow is within 10% of the mass flow when R-404A is run at the same operating conditions.

Embodiment B8

The refrigeration system of any of Embodiments B1-B7 that is a transport refrigeration unit.

Embodiment C1

A method for producing refrigeration comprising evaporating the composition of any of Embodiments A1-A7 in the vicinity of a body to be cooled and thereafter condensing said composition.

Embodiment D1

A method for replacing R-404A in a refrigeration system comprising replacing R-404A with the refrigerant composition of any of Embodiments A1-A7.

Embodiment D2

The method of Embodiment D1, wherein the refrigeration capacity produced by the refrigerant composition is within about 10% of that produced by R-404A under the same operating conditions.

Embodiment D3

The method of any of Embodiments D1-D2, wherein the coefficient of performance obtained is within about 5% of that produced by R-404A under the same operating conditions.

Embodiment D4

The method of any of Embodiments D1-D3, wherein replacing comprises removing the R-404A from the refrigeration system and charging the system with the refrigerant composition of any of Embodiments A1-A7.

Embodiment E1

A method for replacing R-507A in a refrigeration system comprising replacing R-507A with the refrigerant composition of any of Embodiments A1-A7.

Embodiment E2

The method of Embodiment D1, wherein the refrigeration capacity produced by the refrigerant composition is within about 10% of that produced by R-507A under the same operating conditions.

Embodiment E3

The method of any of Embodiments E1-E2, wherein the coefficient of performance obtained is within about 5% of that produced by R-507A under the same operating conditions.

Embodiment E4

The method of any of Embodiments E1-E3, wherein replacing comprises removing the R-507A from the refrigeration system and charging the system with the refrigerant composition of any of Embodiments A1-A7.

What is claimed is:

1. A refrigerant composition comprising:
   a. 11-22 weight percent difluoromethane;
   b. 46-59 weight percent pentafluoroethane; and
   c. 21-35 weight percent 2,3,3,3-tetrafluoropropene;
   wherein the composition is non-flammable as formulated and determined by ASTM E681 at 60° C.

2. The refrigerant composition of claim 1, wherein the composition is non-flammable as formulated and after fractionation as determined by ASTM E681 at 60° C.

3. The refrigerant composition of claim 1 further comprising one or more components selected from the group consisting of lubricants, dyes, solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof.

4. A refrigeration system comprising an evaporator, a condenser, a compressor and an expansion device, wherein the system contains the composition of claim 1.

5. The refrigeration system of claim 4, wherein the compressor discharge temperature is within 20 K of the compressor discharge temperature when R-404A is run at the same operating conditions.

6. The refrigeration system of claim 4, wherein the compressor discharge temperature is lower than the compressor discharge temperature when either R-407A or R-407F is run at the same operating conditions.

7. The refrigeration system of claim 4, wherein the average temperature glide in the condenser and evaporator is less than 4.0 K.

8. The refrigeration system of claim 4, wherein the mass flow is within 10% of the mass flow when R-404A is run at the same operating conditions.

9. The refrigeration system of claim 4 that is a transport refrigeration unit.

10. A method for producing refrigeration comprising evaporating the composition of claim 1 in the vicinity of a body to be cooled and thereafter condensing said composition.

11. A method for replacing R-404A in a refrigeration system comprising removing the R-404A from the refrigeration system and charging the system with the refrigerant composition of claim 1.

12. The method of claim 11, wherein the refrigeration capacity produced by the refrigerant composition is within about 10% of that produced by R-404A under the same operating conditions.

13. The method of claim 11, wherein the coefficient of performance obtained is within about 5% of that produced by R-404A under the same operating conditions.

14. A method for replacing R-507A in a refrigeration system comprising replacing R-507A with the refrigerant composition of claim 1.

15. The method of claim 14, wherein the refrigeration capacity produced by the refrigerant composition is within about 10% of that produced by R-507A under the same operating conditions.

16. The method of claim 14, wherein the coefficient of performance obtained is within about 5% of that produced by R-507A under the same operating conditions.

17. The composition of claim 1 consisting essentially of:
   a. 11 weight percent difluoromethane;
   b. 59 weight percent pentafluoroethane; and
   c. 30 weight percent 2,3,3,3-tetrafluoropropene;
   wherein the composition is non-flammable as formulated and after fractionation as determined by ASTM E681 at 60° C.

18. A method of replacing R-404A in a refrigeration system comprising removing the R-404A from the refrigeration system and charging the system with the refrigerant composition of claim 17, wherein the GWP of the refrigerant composition is less than 2150.

19. A refrigeration system comprising an evaporator, a condenser, a compressor and an expansion device, wherein the system contains the composition of claim 17; wherein the GWP of the refrigerant composition is less than 2150; and wherein the average temperature glide in the condenser and evaporator is less than 4.0 K.

20. The refrigeration system of claim 19 that is a transport refrigeration unit.

* * * * *